(12) United States Patent
Durand

(10) Patent No.: US 6,848,466 B2
(45) Date of Patent: Feb. 1, 2005

(54) RESET TOOL FOR A GAS FUEL TANK AND METHOD FOR USING THE SAME

(75) Inventor: Emma Amelia Durand, Jamestown, RI (US)

(73) Assignee: American Biophysics Corporation, North Kingstown, RI (US)

( * ) Notice: Subject to any disclaimer, the term of this patent is extended or adjusted under 35 U.S.C. 154(b) by 0 days.

(21) Appl. No.: 10/410,476

(22) Filed: Apr. 10, 2003

(65) Prior Publication Data

US 2003/0209269 A1 Nov. 13, 2003

(51) Int. Cl.⁷ .......................... F16K 13/08; F16K 51/00; F16L 37/28
(52) U.S. Cl. ............... 137/315.04; 137/15.18; 137/269; 137/505.42; 137/613; 137/614.2; 251/149.4; 251/149.6
(58) Field of Search ............ 137/15.03, 15.17, 137/15.18, 315.04, 315.41, 505.42, 614.19, 614.2, 269, 270, 270.5, 613, 614.03, 614.05; 29/221.6; 251/149.4, 149.6

(56) References Cited

U.S. PATENT DOCUMENTS

| | | | |
|---|---|---|---|
| 2,263,293 A | | 11/1941 | Ewald |
| 3,194,256 A | * | 7/1965 | Gonella et al. ........ 137/315.41 |
| 3,336,053 A | | 8/1967 | Carse |
| 3,648,893 A | * | 3/1972 | Whiting ...................... 137/517 |
| 3,672,631 A | * | 6/1972 | Grise ....................... 251/149.6 |
| 3,731,718 A | | 5/1973 | Gramig |
| 4,060,219 A | * | 11/1977 | Crawford .................. 251/149.6 |
| 4,210,168 A | * | 7/1980 | Yonezawa ................ 137/614.2 |
| 4,290,440 A | | 9/1981 | Sturgis |
| 4,638,975 A | | 1/1987 | Iuchi et al. |
| 4,807,848 A | | 2/1989 | Macomber |
| 5,037,063 A | | 8/1991 | Kerger et al. |
| 5,290,009 A | * | 3/1994 | Heilmann ................. 251/149.6 |
| 5,330,155 A | * | 7/1994 | Lechner .................... 251/149.6 |
| 5,524,664 A | * | 6/1996 | Lin .......................... 251/149.4 |
| 5,553,638 A | * | 9/1996 | Home ....................... 251/149.6 |
| 5,582,201 A | * | 12/1996 | Lee et al. ................. 251/149.6 |
| 5,657,800 A | | 8/1997 | Campbell |
| RE35,602 E | | 9/1997 | Lechner |
| 5,913,664 A | * | 6/1999 | Shimizu et al. ........... 137/614.2 |
| 6,138,709 A | | 10/2000 | Home |
| 6,155,285 A | * | 12/2000 | Hsiao ............................ 137/75 |
| 6,293,307 B1 | * | 9/2001 | Oi et al. ................... 137/614.2 |
| 6,478,046 B2 | * | 11/2002 | Gabrel ................... 137/505.42 |
| 6,530,394 B2 | * | 3/2003 | Pai ........................... 251/149.6 |
| 6,626,204 B2 | * | 9/2003 | Oi et al. ................... 137/614.2 |
| 6,691,978 B1 | * | 2/2004 | Bartos et al. ............. 251/149.6 |
| 2003/0154643 A1 | | 8/2003 | Spiro et al. |
| 2003/0154645 A1 | | 8/2003 | Spiro et al. |
| 2003/0208951 A1 | | 11/2003 | Bossler |

FOREIGN PATENT DOCUMENTS

| | | |
|---|---|---|
| JP | 1-14128 | 4/1989 |
| JP | 2-63679 | 5/1990 |

* cited by examiner

Primary Examiner—George L. Walton
(74) Attorney, Agent, or Firm—Pillsbury Winthrop LLP

(57) ABSTRACT

A tool and method of utilizing the tool to release pressurized gas trapped between a main valve and a safety valve of a portable liquified petroleum gas tank is disclosed. The tool includes a tank safety valve release member structured to be coupled with the outlet of the fuel tank. The tank safety valve release member is configured to be inserted into the tank outlet and move the tank safety valve to an open position so that pressurized gas can escape to atmosphere.

33 Claims, 7 Drawing Sheets

RESET TOOL FOR A GAS FUEL TANK AND METHOD FOR USING THE SAME

BACKGROUND OF THE INVENTION

1. Field of the Invention

The present invention relates to a tool and a method for using the tool for resetting a safety valve installed on a propane tank.

2. Description of Related Art

An overfill prevention device ("OPD") is a safety valve incorporated into the filling valve of a liquefied petroleum gas, e.g. propane, tank. The OPD is designed to shut off the flow of gas to a tank after the tank has been filled to a predetermined capacity, e.g. 80% capacity. This allows the gas to expand when the tank is subjected to high temperatures, thereby minimizing the potential for an explosion. In the United States, as of Apr. 1, 2002, all propane tanks weighing between four and 40 pounds require the OPD as a safety device.

FIG. 1 illustrates the valve assembly 30 of a typical propane tank that is used in a variety of home applications. As shown in FIG. 1, the valve assembly 30 includes a main valve 34 that is manually operated with a rotatable handle 36 and an OPD 32 that is disposed within outlet 33. Without the OPD 32, there is no device to prevent gas from flowing out of the tank when the main valve is opened. Within the OPD 32 lies a spring biased safety valve 40 that is designed to cut off the flow of gas when there is nothing exerting pressure on it, such as a connected regulator, from the outside of the tank. This prevents the leakage of gas when the main valve 34 is not fully closed and there is nothing attached to the outlet 33 of the valve assembly 30.

Devices, such as barbeque grills, that utilize gas from propane tanks include regulators that attach directly to the propane tanks. FIG. 2 illustrates a regulator assembly 50 that includes an attachment portion 52 that is designed to engage the valve assembly 30 of FIG. 1 and provide a seal so that gas cannot escape around the regulator when the main valve is opened. The regulator assembly 50 also includes a safety device that ensures that the proper pressure is being used. Regulator assemblies 50 used in conjunction with propane tanks in the United States now require a thermal fuse as well as a spring loaded safety shut-off device 51. The safety shut-off 51 device typically includes a free floating ball bearing 60 and a spring 61 that biases the ball bearing 60 towards a closed position. The safety shut-off device 51 reacts to a dramatic increase in line pressure by fully biasing the ball bearing 60 to the closed position, thereby blocking flow of gas into the regulator 62. Also, if the regulator assembly 50 is exposed to excessive heat, the thermal fuse, which is made of a plastic material, will melt and thereby block the flow of gas.

Any impurities contained in the gas can create problems with the operation of the system, as any contaminants introduced by other means, such as such as dropping the regulator assembly 50 on the ground. Contaminants such as dirt or non-gaseous fuel can build up in the regulator assembly 50 and affect the proper functioning of the ball bearing 60 and spring 61. For example, contaminant buildup may cause the ball bearing 60 to stick in the closed position regardless of whether the safety shut-off device 51 has been tripped. For example, this may happen after the regulator assembly 50 is removed from the valve assembly 30 of the propane tank and the ball bearing 60 is allowed to move into the closed position via gravity, without the influence of the spring 61. Thus, if the ball bearing 60 is stuck in the closed position, the safety shut-off device 51 will not necessarily be fully reset upon attachment of the regulator assembly 50 to the tank valve assembly 30 because the flow of gas from the tank may not necessarily push the ball bearing 60 back to an open position.

The safety features of the OPD can create problems for those using propane tanks, particularly when the regulator assembly is removed from the tank and then reinstalled. Once the cut-off valve is engaged, which occurs when the regulator assembly is removed from the valve assembly, it should reopen by re-attaching the regulator assembly. However, the reattachment of the regulator assembly may not fully open the cut-off valve if the user neglects to fully re-attach the regulator assembly. This can impede the flow of gas by as much as 80%. Further, there may be a small volume of high pressure gas that gets trapped in a cavity between the main valve and the cut-off valve that further impairs the opening of the cut-off valve by creating extra resistance.

This problem has frustrated many users of gas tanks equipped with the OPD. Although there is typically some flow upon reattachment of the regulator assembly to the tank valve assembly, in many cases, the flow is not adequate to ensure the proper functioning of the device utilizing the gas.

For example, insect trapping devices, such as the device disclosed in U.S. Pat. No. 6,145,243, are specifically designed to utilize propane from a typical tank at a specific pressure. A regulator is used to deliver propane to the device at a constant predetermined pressure and the device performs a combustion operation to create a $CO_2$ laden out flow for attracting insects. If the propane enters the regulator at a pressure below the predetermined level, the insect trapping device will not operate properly, as the out flowing $CO_2$ content will be too low, or the combustion operation may not even commence. Thus, if the regulator assembly of an insect trapping device is not attached to the gas tank properly, the device may not function at all. This may be interpreted by the user as a problem with the insect trapping device itself rather than a problem with the propane tank connection.

SUMMARY OF THE INVENTION

It is an aspect of the present invention to provide a reset tool for releasing pressurized gas trapped between a main valve and a tank safety valve on an outlet of a gas fuel tank. The outlet has a threaded portion and the tool includes a tank safety valve release member having a threaded portion. The release member is configured to be inserted into the tank outlet with the threaded portion of the release member engaging the threaded portion of the tank outlet so that rotation of the release member advances the release member into the outlet and into engagement with the safety valve to move the safety valve to an open position. The release member has a structure defining at least one gas escape path to enable the pressurized gas trapped between the main valve and the safety valve to escape to atmosphere when the safety valve has been moved to its open position. The tool further includes a drive part connected to the release member for allowing a user to rotate the tool to advance the release member in the outlet.

It is a further aspect of the present invention to provide a reset tool for opening a regulator safety valve on a regulator assembly of a gas utilizing device. The regulator assembly is constructed to be coupled to an outlet of a gas fuel tank to establish gas fuel delivery between the tank and the device. The regulator assembly has a collar with a threaded interior configured to be engageable with a threaded exterior of the tank outlet. The tool includes a regulator safety valve release member having a threaded exterior. The release member is configured to be inserted into the collar of the regulator assembly with the threaded exterior of the release member engaging the threaded interior of the collar so that rotation of the release member into the collar and into engagement with the safety valve to move the safety valve to an open position. The tool further includes a drive part for allowing a user to rotate the tool to advance the release member in the collar.

It is a further aspect of the present invention to provide a method for releasing gas trapped between a main valve and a tank safety valve on an outlet of a gas fuel tank. The method includes inserting a tank safety valve release member into the outlet of the fuel tank, engaging the release member with the tank safety valve to move the safety valve to an open position, and allowing the pressurized gas trapped between the main valve and the safety valve to escape.

It is a further aspect of the present invention to provide a method for opening a regulator safety valve on a regulator assembly of a gas utilizing device. The method includes inserting a regulator safety valve release member into the regulator assembly, engaging the release member with the regulator safety valve, and moving the regulator safety valve to an open position with the release member.

These and other aspects, features, and advantages of this invention will become apparent from the following detailed description when taken in conjunction with the accompanying drawings, which are part of this disclosure and which illustrate, by way of example, the principles of this invention.

BRIEF DESCRIPTION OF THE DRAWINGS

Features of the invention are shown in the drawings, which form part of this original disclosure, in which.

DETAILED DESCRIPTION OF THE INVENTION

Figure 1:
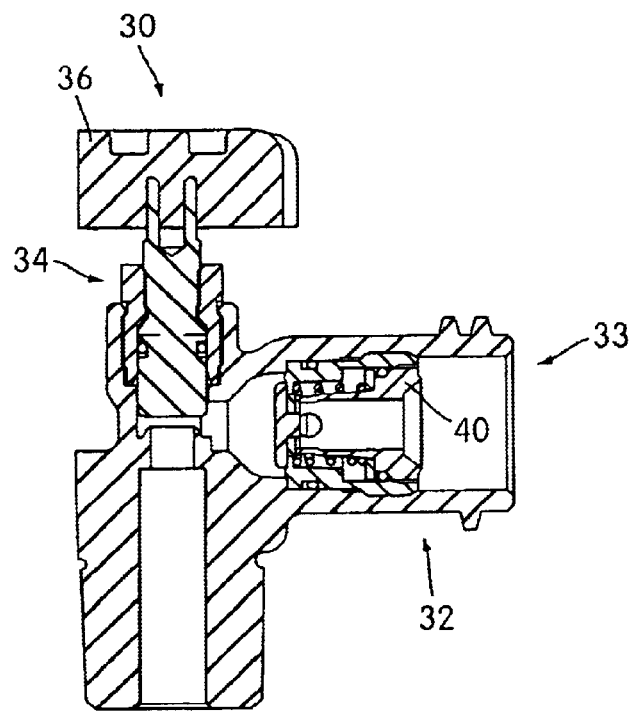
FIG. 1 is a cross-sectional view of a gas tank valve assembly with an OPD.
Figure 2:
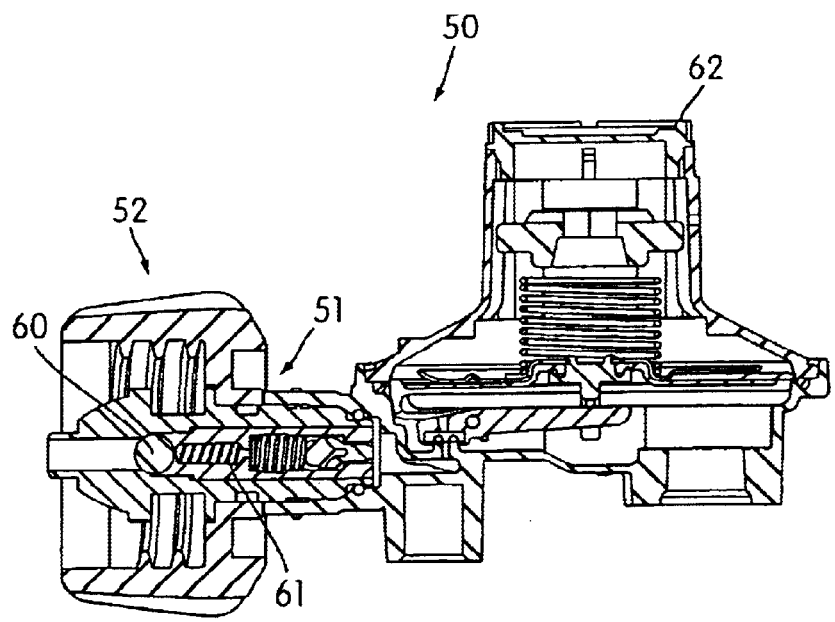
FIG. 2 is a cross-sectional view of a regulator assembly of a gas utilizing device.
Figure 3:
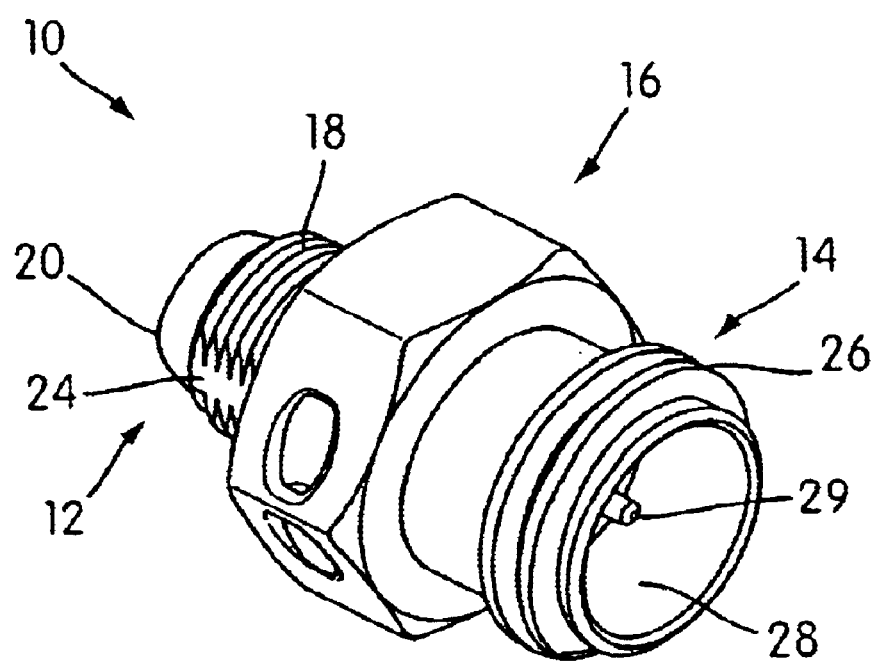
FIG. 3 is a perspective view of an OPD reset tool.
Figure 4:
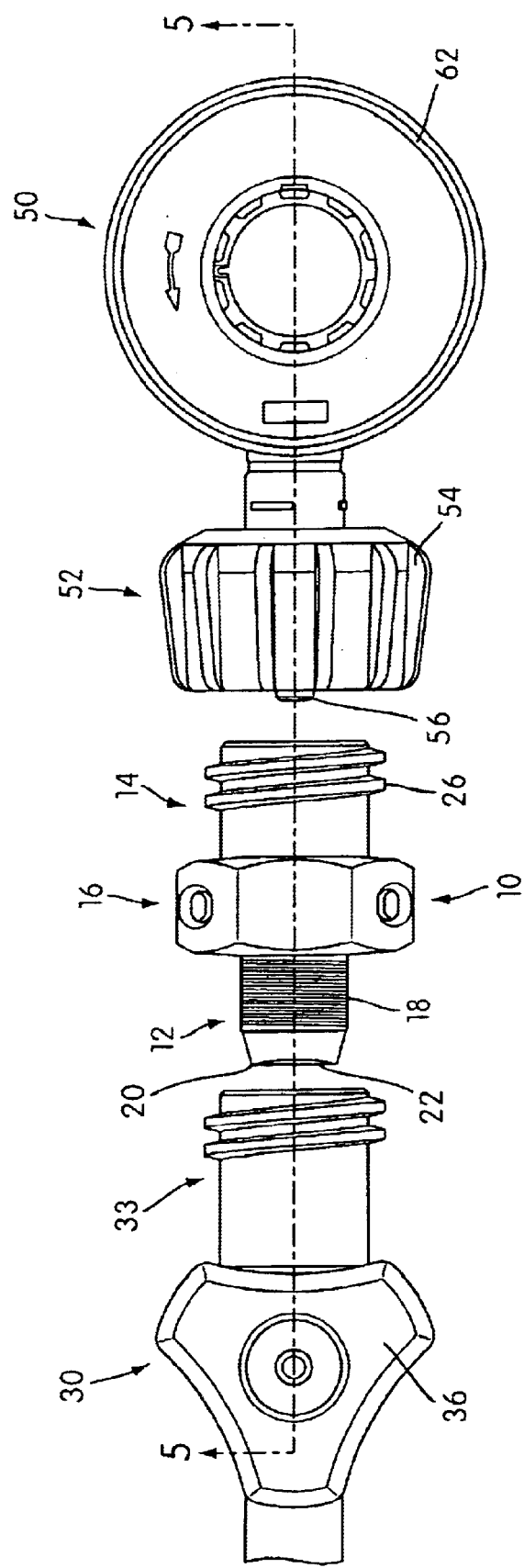
FIG. 4 is a top exploded view of the gas tank valve assembly of FIG. 1, the OPD reset tool of FIG. 3, and the regulator assembly of FIG. 2.

The present invention is directed to an overfill prevention device ("OPD") reset tool 10, illustrated in FIG. 3, that is part of an overall system that includes a gas tank valve assembly 30 and a regulator assembly 50 that is located on a gas utilizing device.

Figure 5:
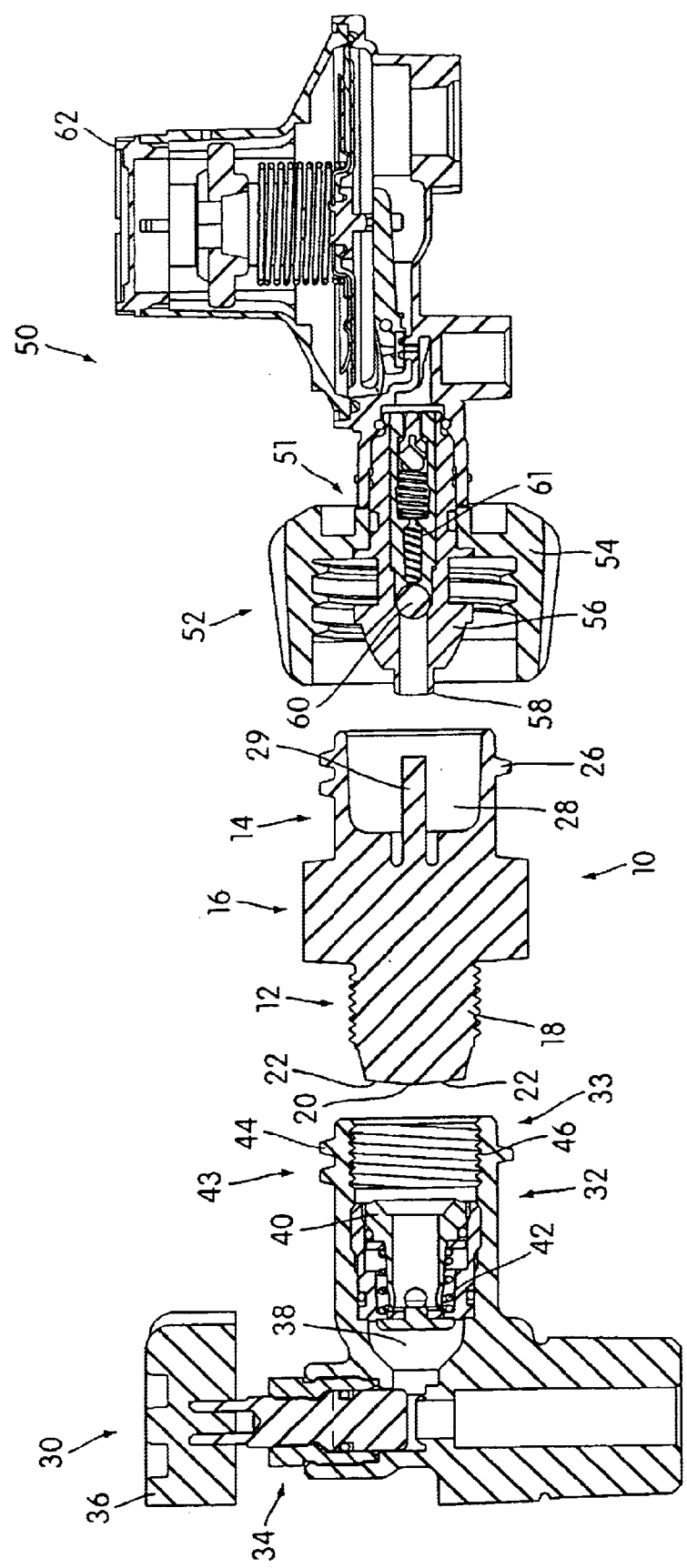
FIG. 5 is a cross-sectional view taken along line 5—5 of FIG. 4.
Figure 6:
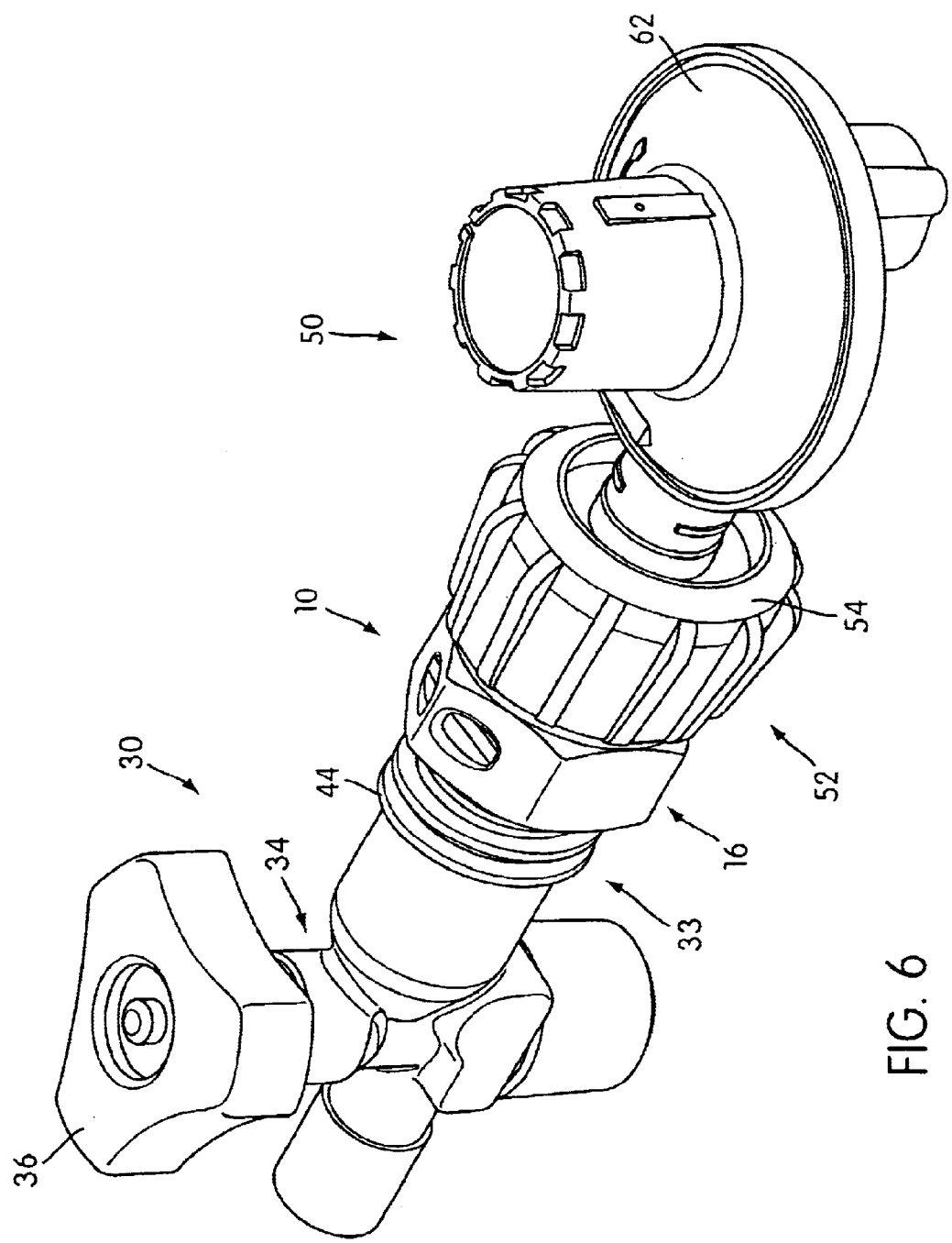
FIG. 6 is a perspective view of the gas tank valve assembly, the OPD reset tool, and the regulator assembly of FIG. 4 in the fully engaged position.
Figure 7:
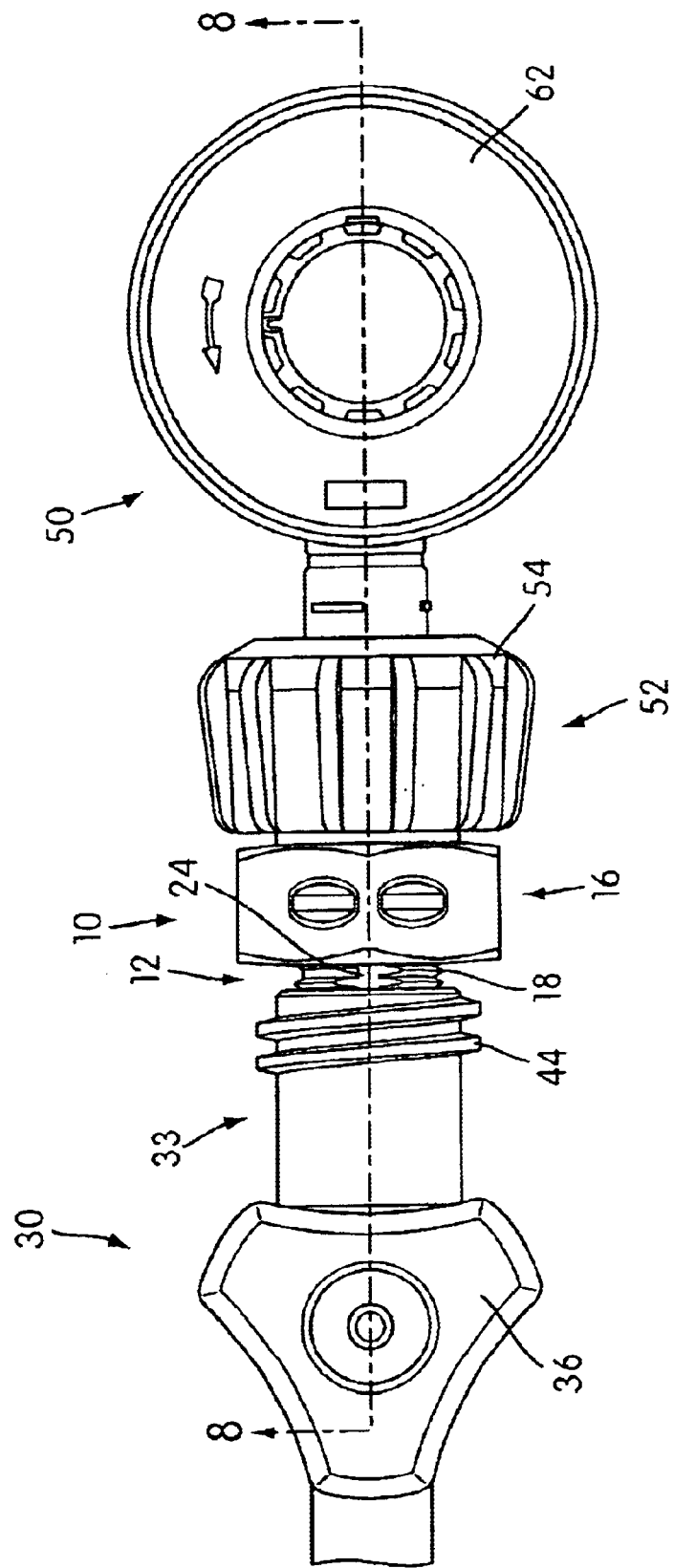
FIG. 7 is a top view of FIG. 6.
Figure 8:
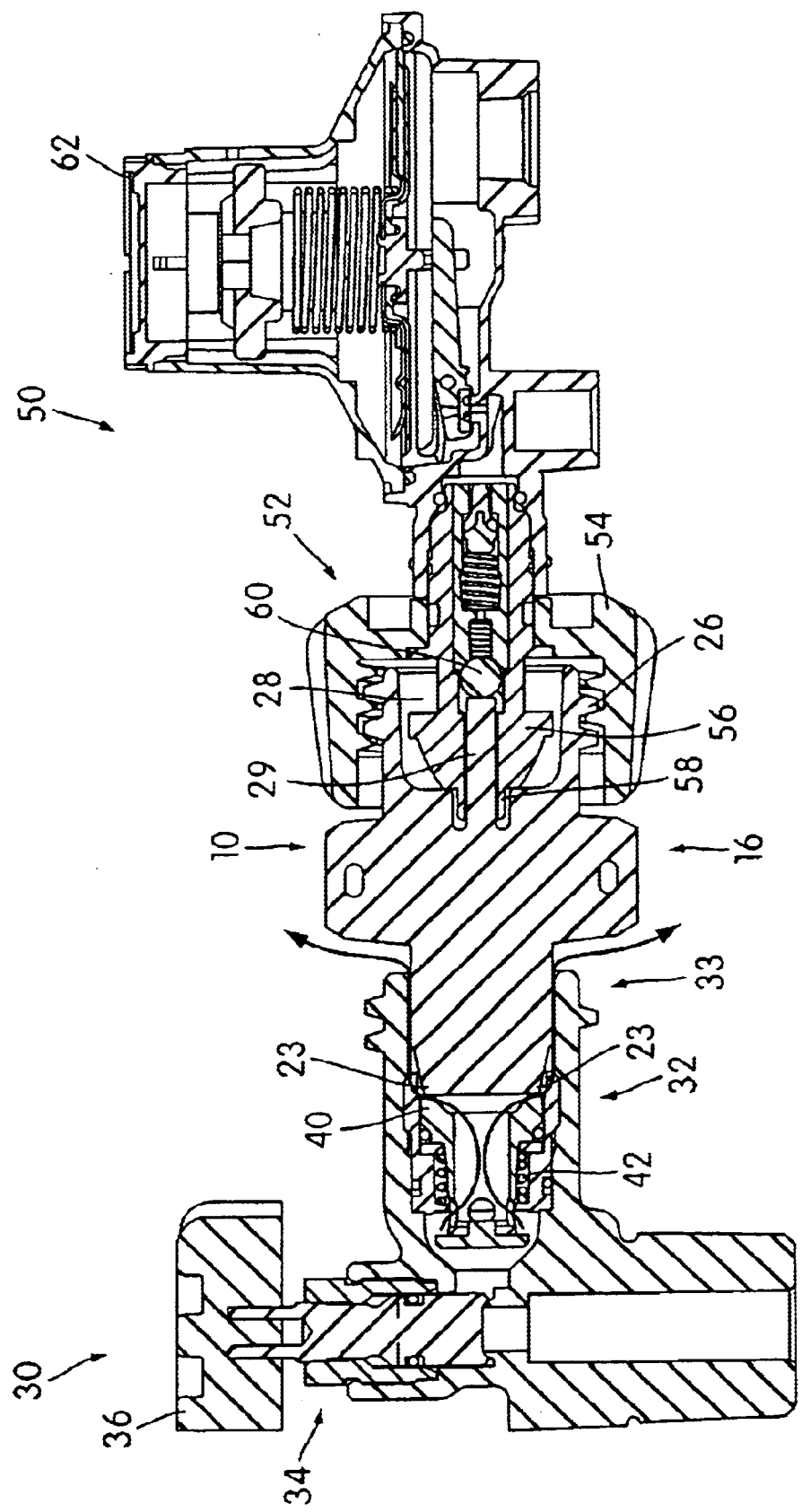
FIG. 8 is a cross-sectional view taken along line 8—8 of FIG. 7.

A typical gas tank valve assembly 30 is illustrated in FIGS. 1, 4, 5, 6, 7, and 8. The valve assembly 30 includes an OPD 32 and a main valve 34. The main valve 34 includes a rotatable handle 36 that can be grasped and rotated by an operator to either open or close the main valve 34. FIG. 5 shows the main valve 34 in an open position and FIG. 8 shows the main valve 34 in a closed position. The OPD 32 is disposed within a valve assembly outlet 33 and includes a spring-loaded safety valve 40 that is biased by a spring 42 to a closed position. A cavity 38 lies between the main valve 34 and safety valve 40 and receives the safety valve 40 when the safety valve 40 is in the open position. In order for gas to exit the fuel tank, the main valve 34 must be in the open position and suitable force must be applied to the safety valve 40 of the OPD 32 such that the spring 42 is compressed and the safety valve 40 is in the open position. The outlet 33 includes a threaded portion 43. The threaded portion 43 includes exterior threads 44 and interior threads 46.

A typical regulator assembly 50 is illustrated in FIGS. 2, 4, 5, 6, 7, and 8. The regulator assembly 50 includes an attachment portion 52 that attaches directly to the gas tank valve assembly 30 and a regulator 62. The attachment portion 52 includes a rotatable collar 54 and an engaging portion 56. The collar 54 is provided with threads 55 to receive the matching exterior threads 44 of the outlet 33. The engaging portion 56 includes a hollow shaft and a shut-off device 51 disposed within the hollow shaft 58. The shut-off device 51 typically includes a free floating ball bearing 60 and a spring 61. The engaging portion 56 is shaped to engage the safety valve 40 of the OPD 32 such that a mechanical seal is created between the two parts. As the collar 54 is tightened onto the valve assembly 30, the engaging portion 56 provides the suitable force needed to move the safety valve 40 to the open position against the spring bias. When the collar 54 is fully tightened, the safety valve 40 is in the fully opened position such that the gas flow is not obstructed. As long as the ball bearing 60 in the regulator assembly 50 is able to freely move back against the bias of spring 61, when the rotatable handle 36 of the main valve 34 is turned to the fully open position, gas will enter the regulator 62.

In proper operation, before the regulator assembly 50 is removed from the valve assembly 30, the rotatable handle 36 of the main shut off valve 34 is turned to the fully closed position. Once the main shut off valve 34 is fully closed, the regulator assembly 50 can be removed by unscrewing the collar 54 from the valve assembly 30. As the collar 54 is removed, the spring 42 biases the safety valve 40 of the OPD 32 towards the closed position. When the regulator assembly 50 is free from the valve assembly 30, the safety valve 40 is in the fully closed position, thereby sealing off the cavity 38 from the outside of the tank.

Depending on the exact sequencing of events, pressurized gas may accidentally get trapped between the main shut off valve 34 and the safety valve 40 of the OPD 32 in the cavity 38. This may create problems when the regulator assembly 50 is reattached to the valve assembly 30. Often, when the regulator assembly 50 is reattached to the valve assembly 30, the safety valve 40 of the OPD 32 does not fully open because of the pressure being exerted on it from the gas located within the cavity 38. Similarly, the ball bearing 60 in the regulator assembly 50 may not be in the correct position to allow for the full flow of gas into the regulator 50. This causes the gas utilizing device to not function properly. The OPD reset tool 10 insures that both the valve assembly 30 and the regulator assembly 50 function properly once the regulator assembly 50 is attached to the valve assembly 30.

The OPD reset tool 10 includes a tank safety valve release member 12 and a regulator safety valve release member 14 and a drive part 16 disposed between the tank safety valve release member 12 and the regulator safety valve release member 14. The tank safety valve release member 12 is shaped such that it can be inserted into a gas tank valve assembly 30. In the preferred embodiment, once the tank safety valve release member 12 of the tool 10 is fully inserted into the gas tank valve assembly 30, it becomes fully engaged with the valve assembly 30, as illustrated in FIGS. 6, 7, and 8. The tank safety valve release member 12 may be substantially smooth on the outside, or it may include a threaded portion 18. Preferably, the tank safety valve release member 12 includes the threaded portion 18 and the threaded portion 18 is engageable with the threaded portion 43 of the outlet 33. This allows for the tightening and indexing of the tool 10 such that when the tool 10 is fully tightened, it moves the safety valve 40 into the fully open position. When the safety valve 40 is in the open position, any pressurized gas located on the opposite side of the safety valve 40 will escape past the reset tool 10 and out into the atmosphere, as illustrated in FIG. 8. Thus, the reset tool 10 "resets" the valve assembly 30 such that it is ready to receive the regulator assembly 50 and function properly.

A cross-section of the preferred embodiment of the reset tool 10 is illustrated in FIG. 5. The tank safety valve release member 12 of the tool 10 further includes an engaging surface 20 that is shaped such that it provides the necessary force to open the safety valve 40 and allows for gas to escape out of the valve assembly 30 to the atmosphere. As shown in the figures, the tank safety valve release member 12 of the reset tool 10 is substantially solid. Alternatively, the tank safety valve release member 12 may be substantially hollow or contain holes such that any gas that escapes out of the valve assembly 30 escapes to the atmosphere through the holes or the hollow center. Also, the tank safety valve release member may be shaped such that it includes threads that engage the exterior threads 44 of the outlet 33. In the preferred embodiment, the engaging surface 20 includes at least one bevel 22 so that the reset tool 10 contacts the safety valve 40 at two opposite points 23, rather than create a complete seal between the tool 10 and the safety valve 40. Preferably, the engaging surface 20 includes two bevels 22. As shown in FIG. 3, the threads 18 that are disposed on the tank safety valve release member 12 are not continuous about the circumference of the tool 10, but instead are interrupted by at least one substantially flat portion 24. This allows for gas to escape out of the cavity 38 in a path defined between the tank outlet 33 and the flat portions 24 and into the atmosphere.

The regulator safety valve release member 14 of the reset tool 10 is shaped such that it can be inserted into the attachment portion 52 of the regulator assembly 50. Once the regulator safety valve release member 14 of the tool 10 is fully inserted into the regulator assembly 50, it becomes fully engaged with the regulator assembly 50, as illustrated in FIGS. 6, 7, and 8. The regulator safety valve release member 14 may be substantially smooth on the outside, or it may include threads 26 that match the threads 55 located within the collar 54 of the regulator assembly 50. Preferably, the regulator safety valve release member 14 includes threads 26.

The regulator safety valve release member 14 further includes a cavity 28 that is sized and shaped to received the engaging portion 56 of the regulator assembly 50. A protrusion 29 is disposed within the cavity 28 such that it can be inserted into the hollow shaft 58 of the engaging portion 56 of the regulator assembly 50. The protrusion 29 extends to the shut-off device 51 when the tool 10 is fully engaged with the regulator assembly 50. The ensures that the ball bearing 60 is free to move and will not block the flow of gas once the regulator assembly 50 is reattached to the valve assembly 30.

The drive part 16 is preferably shaped to receive a leveraging tool. For example, the drive part 16 is shaped to receive a person's hand such that a person could grasp the tool and fully engage it with the valve assembly and the regulator assembly. In the preferred embodiment, illustrated in FIG. 3, the drive part 16 is substantially hexagonal in shape. This way, a wrench or the like, can be used to properly tighten the reset tool 10 with respect to the valve assembly 30 and/or the regulator assembly 50.

The reset tool 10 may be manufactured from any suitable material that will allow the proper tolerances and stiffness to ensure that the tool 10 functions properly. Preferably, the tool 10 is manufactured from metal or plastic. More preferably, the tool 10 is injection molded from a plastic with suitable hardness so as not to distort when the tool 10 is fully tightened and engaged with the valve assembly 30 or the regulator assembly 50.

In operation, before the regulator assembly 50 is attached to the valve assembly 30, the tank safety valve release member 12 of the reset tool 10 is inserted into the valve assembly 30 and fully tightened. In the preferred embodiment, the tank safety valve release member 12 of the reset tool 10 includes threads 18 and is inserted into the valve assembly 30 and rotated in the counter-clockwise direction until the tool 10 cannot rotate any further. This ensures that the safety valve 40 is fully opened to allow for any gas located in the cavity 38 to escape to the atmosphere.

The hollow shaft 58 of the regulator assembly 50 is then aligned with the protrusion 29 of the regulator safety valve release member 14 of the reset tool 10. While holding the reset tool 10 in place, the collar 54 of the regulator assembly 50 is attached to the regulator safety valve release member 14 of the reset tool 10 and fully tightened. In the preferred embodiment, the regulator safety valve release member 14 of the reset tool 10 includes threads 26 and the collar 54 is attached to the regulator safety valve release member 14 and rotated in the clockwise direction until the collar 54 cannot be tightened any further. This ensures that the ball bearing 60 is repositioned so as to allow the flow of gas into the regulator 62 once the regulator assembly 50 is reattached to the valve assembly 30.

In the preferred embodiment, while holding the reset tool 10 in place, the collar 54 can then be rotated in the counterclockwise direction so as to loosen and become detached from the reset tool 10. The rest tool 10 can then be rotated in the clockwise direction and removed from the valve assembly 30. The OPD 32 is now reset and the regulator assembly 50 is ready to be attached to the valve assembly 30 of the gas tank.

Alternatively, the tank safety valve release member 12 of the reset tool 10 is inserted into the valve assembly 30 and fully tightened. This ensures that the safety valve 40 is fully opened to allow for any gas located in the cavity 38 to escape to the atmosphere. The reset tool 10 is then loosened from the valve assembly 30 and removed.

The regulator safety valve release member 14 of the reset tool 10 can then be inserted into the collar 54 of the regulator assembly 50, by aligning the protrusion 29 of the reset tool 10 with the hollow shaft 58 of the regulator assembly 50, and fully tightened. This ensures that the ball bearing 60 is repositioned so as to allow the flow of gas into the regulator 62 once the regulator assembly 50 is reattached to the valve assembly 30. The reset tool 10 is then loosed from the regulator assembly 50 and removed.

The regulator assembly 50 of the gas utilizing device is now ready to be attached to the tank valve assembly 30. For example, an insect trapping device as described in co-owned and co-pending U.S. patent application Ser. No. 10/264,260, herein incorporated by reference in its entirety, or as described in co-owned U.S. Pat. No. 6,145,243, herein incorporated by reference in its entirety, is now ready to be attached to a propane tank. Upon attachment, the insect trapping device will now receive the proper flow of gas and will provide the proper combustion to create the proper $CO_2$ laden out flow for attracting insects.

While preferred embodiments of the invention have been shown and described, it is evident that variations and modifications are possible that are within the spirit and scope of the preferred embodiments described herein.

It is understood that any references to direction are in conformance with the current standard fittings used in such equipment and are not intended to characterize the devices as being used in any particular orientation, or as otherwise limiting.

What is claimed is:

1. A reset tool for releasing pressurized gas trapped in an interior space between a main valve and a safety valve of a valve assembly mounted on an outlet of a gas fuel tank, the valve assembly having an outlet with a threaded portion, the tool comprising:

a tank safety valve release member having a threaded portion, the release member being configured to be inserted into the valve assembly outlet with the threaded portion of the release member engaging the threaded portion of the valve assembly outlet so that rotation of the release member advances the release member into the valve assembly outlet and into engagement with the safety valve to move the safety valve to an open position;

the release member having structure defining at least one gas escape path to enable the pressurized gas trapped in the interior space to escape to atmosphere when the safety valve has been moved to its open position; and a drive part connected to the release member for allowing a user to rotate the tool to advance the release member in the outlet, wherein the structure defining the at least one escape path is provided on the exterior of the release member and cooperates with the valve assembly outlet to enable the pressurized gas to escape to the atmosphere around the release member, prior to the attachment of a gas utilizing device.

2. The reset tool of claim 1, wherein the threaded portion of the release member is provided on the exterior of the release member.

3. The reset tool of claim 2, wherein the structure defining the at least one escape path includes at least one flat surface extending longitudinally along the release member and interrupting the threads thereon.

4. The reset tool of claim 1, wherein the structure defining the at least one escape path includes a beveled surface on an end of the release member that engages the safety valve upon insertion of the release member into the valve assembly outlet.

5. The reset tool of claim 1, wherein the release member is substantially solid.

6. The reset tool of claim 1, wherein the tool comprises metal.

7. The reset tool of claim 1, wherein the tool comprises plastic.

8. The reset tool of claim 1, wherein the drive part is shaped to receive a leveraging tool.

9. The reset tool of claim 8, wherein the drive part is shaped to receive a wrench.

10. The reset tool of claim 8, wherein the drive part is hexagonal in shape.

11. A reset tool for opening a regulator safety valve on a regulator assembly of a gas utilizing device, the regulator assembly being constructed to be coupled to an outlet of a valve assembly of a gas fuel tank to establish gas fuel delivery between the gas fuel tank and the device, the regulator assembly having a collar with a threaded interior configured to be engageable with a threaded exterior of the valve assembly outlet, the tool comprising:

a regulator safety valve release member having a threaded exterior, the release member being configured to be inserted into the collar of the regulator assembly with the threaded exterior of the release member engaging the threaded interior of the collar so that rotation of the release member into the collar and into engagement with the safety valve to move the safety valve to an open position for repositioning the safety valve prior to attachment of the regulator assembly to the valve assembly; and a drive part for allowing a user to rotate the tool to advance the release member in the collar.

12. The reset tool of claim 11, wherein the release member comprises a cavity portion and a protrusion disposed within the cavity portion, wherein when the release member is engaged with the collar, the protrusion moves the safety valve to an open position.

13. The reset tool of claim 11, wherein the tool comprises metal.

14. The reset tool of claim 11, wherein the tool comprises plastic.

15. The reset tool of claim 11, wherein the drive part is shaped to receive a leveraging tool.

16. The reset tool of claim 15, wherein the drive part is shaped to receive a wrench.

17. The reset tool of claim 15, wherein the drive part is hexagonal in shape.

18. A reset tool for releasing pressurized gas trapped in an interior space between a main valve and a safety valve of a valve assembly mounted on an outlet of a gas fuel tank, the valve assembly having an outlet with a an interior threaded portion and for opening a regulator safety valve on a regulator assembly of a gas utilizing device, the regulator assembly being constructed to be coupled to the outlet of the valve assembly to establish gas fuel delivery between the tank and the device, the regulator assembly having a collar with a threaded interior configured to be engageable with a threaded exterior of the valve assembly outlet, the tool comprising:

a tank safety valve release member having a threaded portion, the release member being configured to be inserted into the valve assembly outlet with the threaded portion of the tank safety valve release member engaging the interior threaded portion of the valve assembly outlet so that rotation of the release member advances the release member into the outlet and into engagement with the safety valve to move the safety valve to an open position;

the tank safety valve release member having structure defining at least one gas escape path to enable the pressurized gas trapped in the interior space to escape to atmosphere when the safety valve has been moved to its open position;

a regulator safety valve release member having a threaded exterior, the regulator safety valve release member being configured to be inserted into the collar of the regulator assembly with the threaded exterior of the regulator safety valve release member engaging the threaded interior of the collar so that rotation of the regulator safety valve release member into the collar and into engagement with the regulator safety valve to move the regulator safety valve to an open position for repositioning the regulator safety valve prior to attachment of the regulator assembly to the valve assembly; and a drive part disposed between the tank safety valve release member and the regulator safety valve release member for allowing a user to rotate the tool to advance the tank safety valve release member in the valve assembly outlet and to advance the regulator safety valve release member in the collar.

19. The reset tool of claim 18, wherein the threaded portion of the tank safety valve release member is provided on the exterior of the tank safety valve release member.

20. The reset tool of claim 19, wherein the structure defining the at least one escape path includes at least one flat surface extending longitudinally along the tank safety valve release member and interrupting the threads thereon.

21. The reset tool of claim 19, wherein the structure defining the at least one escape path is provided on the exterior of the tank safety valve release member and cooperates with the valve assembly outlet to enable the pressurized gas to escape to the atmosphere around the tank safety valve release member.

22. The reset tool of claim 21, wherein the structure defining the at least one escape path includes a beveled surface on an end of the tank safety valve release member that engages the safety valve upon insertion of the tank safety valve release member into the valve assembly outlet.

23. The reset tool of claim 18, wherein the tank safety valve release member is substantially solid.

24. The reset tool of claim 18, wherein the regulator safety valve release member comprises a cavity portion and a protrusion disposed within the cavity portion, wherein when the regulator safety valve release member is engaged with the collar, the protrusion moves the regulator safety valve to an open position.

25. The reset tool of claim 18, wherein the tool comprises metal.

26. The reset tool of claim 18, wherein the tool comprises plastic.

27. The reset tool of claim 18, wherein the drive part is shaped to receive a leveraging tool.

28. The reset tool of claim 27, wherein the drive part is shaped to receive a wrench.

29. The reset tool of claim 27, wherein the drive part is hexagonal in shape.

30. A method for releasing pressurized gas trapped in an interior space between a main valve and a safety valve of a valve assembly mounted on an outlet of a gas fuel tank, the valve assembly having an outlet, the method comprising:

inserting a reset tool into the outlet of the valve assembly;

engaging a release member of the reset tool with the safety valve to move the safety valve to an open position;

allowing the pressurized gas trapped in the interior space to escape therefrom; and removing the reset tool from the outlet of the valve assembly prior to coupling an inlet of a regulator assembly of a gas utilizing device to the outlet of the valve assembly.

31. A method for releasing pressurized gas trapped in an interior space between a main valve and a safety valve of a valve assembly mounted on an outlet of a gas fuel tank, the valve assembly having an outlet, the method comprising:

inserting a reset tool into the outlet of the valve assembly;

engaging a release member of the reset tool with the safety valve to move the safety valve to an open position; and allowing the pressurized gas trapped in the interior space to escape therefrom, wherein the release member comprises threads and engaging the release member with the safety valve comprises screwing the release member into the outlet of the valve assembly.

32. A method for opening a regulator safety valve on a regulator assembly of a gas utilizing device, the method comprising:

inserting a reset tool into the regulator assembly;

engaging a release member of the reset tool with the regulator safety valve;

moving the regulator safety valve to an open position for repositioning the regulator safety valve with the release member; and removing the reset tool from the regulator assembly prior to coupling the regulator assembly to an outlet of a valve assembly of a gas fuel tank.

33. A method for opening a regulator safety valve on a regulator assembly of a gas utilizing device, the method comprising:

inserting a reset tool into the regulator assembly;

engaging a release member of the reset tool with the regulator safety valve; and moving the regulator safety valve to an open position for repositioning the regulator safety valve with the release member, wherein the release member comprises threads and engaging the release member with the regulator safety valve comprises screwing the release member into the regulator assembly.

* * * * *